United States Patent [19]

Watanabe et al.

[11] Patent Number: 4,677,330
[45] Date of Patent: Jun. 30, 1987

[54] MINIATURE MOTOR WITH FRANGIBLE MAGNET RETAINING BOSS

[75] Inventors: Tsutomu Watanabe; Tsutomu Saya; Hiroshi Takashima; Ryoichi Someya; Hiroaki Kobayashi, all of Matsudo, Japan

[73] Assignee: Mabuchi Motor Co., Ltd., Japan

[21] Appl. No.: 907,302

[22] Filed: Sep. 12, 1986

[30] Foreign Application Priority Data

Sep. 12, 1985 [JP] Japan ............... 60-202382

[51] Int. Cl.⁴ ............... H02K 15/14; H02K 21/28
[52] U.S. Cl. ............... 310/154; 29/596; 264/138; 264/152; 310/42; 310/89
[58] Field of Search ............... 264/138, 152; 310/42, 310/43, 40 MM, 154, 89, 239, 254, 258; 29/596

[56] References Cited

U.S. PATENT DOCUMENTS

| | | | |
|---|---|---|---|
| 2,306,233 | 12/1942 | Smith | 310/42 |
| 3,838,300 | 9/1974 | O'Connor, III | 310/239 |
| 4,302,637 | 11/1981 | Ditzig | 200/300 |
| 4,445,060 | 4/1984 | Rühle et al. | 310/154 |

Primary Examiner—Patrick R. Salce
Assistant Examiner—D. L. Rebsch
Attorney, Agent, or Firm—McGlew and Tuttle

[57] ABSTRACT

A miniature motor comprising a hollow tubular-shaped large case having a magnet along the inner circumferential surface thereof, and a small case (end bell) fitted to the large case and having brush holders, made of a synthetic resin, and magnet retaining bosses making contact with the magnet; and characterized in that each of the brush holders has a boss insert hole into which the magnet retaining boss is press-fitted; one end of the magnet retaining boss being pushed by the magnet, at small case installation, causing the magnet retaining boss to be press-fitted into the boss insert hole, whereby the small case is fitted into the large case in a state where the end of the magnet retaining boss makes contact with the magnet.

3 Claims, 7 Drawing Figures

MINIATURE MOTOR WITH FRANGIBLE MAGNET RETAINING BOSS

BACKGROUND OF THE INVENTION

This invention relates generally to a miniature motor, and more particularly to a miniature motor comprising a hollow tubular large case having a magnet disposed along the inner circumferential surface thereof, and a small case fitted to the large case and having brush holders, made of a synthetic resin, and magnet retaining bosses making contact with the magnet, in which the small case is fitted to the large case in a state where the magnet retaining bosses are brought into contact with the magnet by providing boss insert holes into which the magnet retaining bosses are press-fitted.

DESCRIPTION OF THE PRIOR ART

In miniature motors, a magnet retaining boss 4 is usually provided on a small case 3, which is protruded from the small case 3 so as to make contact with a magnet 2, which is provided along the inner circumferential surface of a hollow tubular large case 1 to prevent the unwanted movement of the magnet 2, as shown in FIG. 3. In FIG. 3, reference numeral 5 refers to a rotor; 6 to a rotating shaft; 7 to a commutator; 8 to a bearing; 9 to a brush; 10 to a terminal.

In miniature motors of the conventional type, too short a magnet retaining boss 4 would result in a gap, as shown by arrow G, between the magnet 2 and the magnet retaining boss 4, leading to the unwanted movement of the magnet 2. If the magnet retaining boss 4 is too long, on the contrary, the tip of the magnet retaining boss 4 would have to be cut because of the difficulty in mounting the small case 3 at a predetermined position on the large case 1.

To prevent the gap from being caused between the magnet 2 and the magnet retaining boss 4, it has been conceived that ribs 4' and 4', disposed in a V shape, are provided on the tip of the magnet retaining boss 4 so that the ribs 4' and 4' are slightly flexed to ensure a positive contact with the magnet 2, as shown in FIGS. 4 (A) and (B). (FIG. 4 (A) is a front view, and FIG. 4 (B) is a plan view.) In the example shown in FIG. 4, however, the following problems are encountered.

(a) The difficulty in increasing the length of the ribs 4' and 4' limits the range of adjustment of the gap (shown by arrow G in FIG. 3) between the magnet 2 and the magnet retaining boss 4.

(b) This method cannot be applied to miniature motors having small external dimensions (due to the limited space available).

(c) When small case 3 is extracted from the large case 1, the ribs 4' and 4' tend to be subjected to strains since the ribs 4' and 4' are disposed in a direction intersecting the direction in which the small case 3 is extracted from the large case 1, as shown in FIG. 4 (A).

(d) The manufacture of a metal mold of such a complex shape would result in increased man-hours and therefore increased mold manufacturing cost.

SUMMARY OF THE INVENTION

This invention is intended to overcome these problems.

It is an object of this invention to provide a miniature motor comprising a hollow tubular-shaped large case having a magnet disposed along the inner circumferential surface thereof, and a small case fitted to the large case and having brush holders, made of a synthetic resin, and magnet retaining bosses making contact with the magnet, and having such a construction that each of the brush holders has a boss insert hole into which the magnet retaining boss is press-fitted; one end of the magnet retaining boss is pushed by the magnet, at small case installation, causing the magnet retaining boss to be press-fitted into the boss insert hole, whereby the small case is fitted into the large case in a state where the end of the magnet retaining boss makes contact with the magnet.

It is another object of this invention to provide a miniature motor having such a construction that each of the magnet retaining bosses is formed integrally with the brush holder; the magnet retaining boss being connected to the brush holder with a knockout portion that can be easily cut away when a pushing force is applied to the end of the boss; and a boss insert hole into which the magnet retaining boss is inserted is provided on each of the brush holder; the knockout portion being cut away when pushing force is applied to the end of the magnet retaining boss, causing the magnet retaining boss to be press-fitted into the boss insert hole.

It is still another object of this invention to provide a miniature motor having such a construction that each of the magnet retaining bosses is formed separately in advance by cutting away the knockout portion, and the small case is fitted to the large case in a state where the magnet retaining boss is press-fitted into the boss insert hole to a predetermined depth.

These and other objects will become more apparent upon a reading of the following detailed description taken in connection with FIGS. 1, 2 (A) and 2 (B).

BRIEF DESCRIPTION OF THE DRAWING

FIG. 1 (A) being a front view, and FIG. 1 (B) a cross-sectional side elevation.

DETAILED DESCRIPTION OF THE EMBODIMENT

Figure 1A:
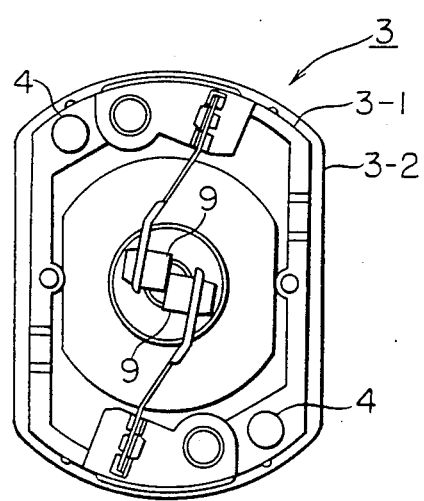
FIG. 1 (A) and 1 (B) is a diagram illustrating an example of a small case in a miniature motor embodying this invention.
Figure 1B:
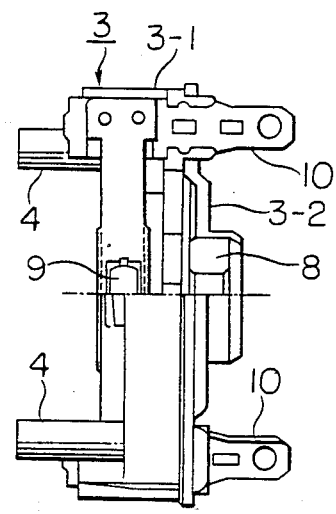
Figure 2A:
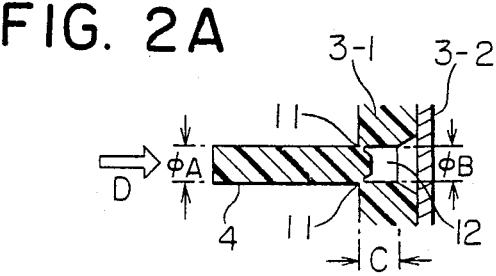
FIGS. 2 (A) and (B) are diagrams of assistance in explaining an example of a magnet retaining boss used in this invention.
Figure 2B:
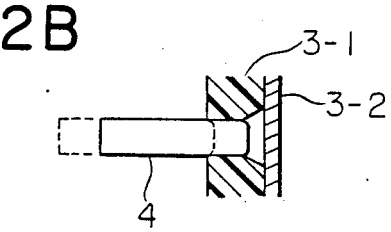
Figure 3:
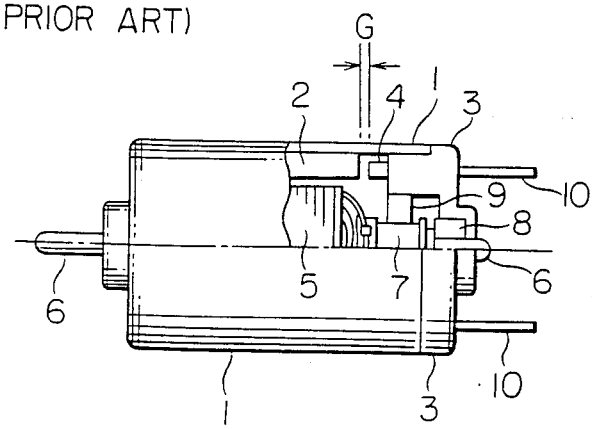
FIG. 3 is a diagram illustrating the construction of a miniature motor of the conventional type.
Figure 4A:
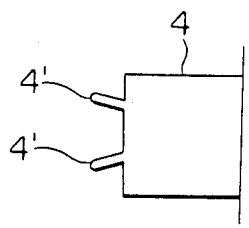
FIG. 4 is a diagram illustrating a magnet retaining boss of the conventional type.
Figure 4B:
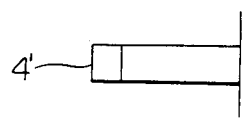

Reference numeral 11 in FIGS. 1 and 2 indicates a knockout portion; 12 a boss insert hole; and other numerals correspond with like parts shown in FIG. 3. Numeral 3-1 refers to a brush holder made of a synthetic resin; 3-2 to a metallic shell plate of the small case 3, both comprising the small case 3.

FIG. 1 shows an example of the small case 3 in the miniature motor of this invention. On the brush holder 3-1 of the small case 3 provided is the frangible magnet retaining boss 4 whose length can be easily adjusted, as will be described later, referring to FIG. 2. In the following, the magnet retaining boss 4 will be described in detail, referring to FIGS. 2 (A) and (B).

FIG. 2 (A) is a diagram illustrating the shape of the magnet retaining boss 4 which is injection-molded integrally with the brush holder 3-1. That is, the magnet retaining boss 4 is formed integrally with the brush holder, connected by the frangible knockout portion 11 that can be easily broken away as a pushing force is applied to the thereof, as shown in FIG. 2 (A). On the brush holder 3-1 is the boss insert hole 12 into which the magnet retaining boss 4 is press-fitted. When a pushing force is applied onto the end of the magnet retaining boss 4 in a direction shown by arrow D in the figure at small case installation, the knockout portion 11 is cut away and the magnet retaining boss 4 is forced into the boss insert hole 12. The resistance to the movement of the magnet retaining boss 4 when forced into the boss insert hole 12 can be adjusted by appropriately selecting the dimensions shown by arrows $\phi A$, $\phi B$ and C in FIG. 2 (A).

When the small case 3 shown in FIG. 1 having the magnet retaining boss 4 described above is fitted to the large case shown in FIG. 3 during motor assembly, a pushing force is exerted as the end of the magnet retaining boss 4 makes contact with the magnet 2, causing the magnet retaining boss 4 to be press-fitted into the boss insert hole 12, as described, referring to FIG. 2. As a result, the small case 3 is fitted to the large case 1 in a state where the end of the magnet retaining boss 4 makes contact with the magnet, thus preventing the magnet 2 from moving in the direction of the motor rotating shaft. In the foregoing, reference has been made as to the example where the small case 3 is fitted to the large case 1, using the magnet retaining boss 4 integrally formed with the brush holder 3-1 at the knockout portion 11, as shown in FIG. 2 (A). The small case, however, may be fitted to the large case 1 in a state where the magnet retaining boss 4 is separated in advance from the brush holder 3-1 at the knockout portion 11, and inserted into the boss insert hole 12 to a predetermined depth.

As described above, this invention makes it possible to prevent the magnet from moving by bringing the magnet retaining boss into contact with the magnet at all times after the small case has been fitted to the large case because the protruded length of the magnet retaining boss can be automatically adjusted by the pushing force generated when the magnet retaining boss is brought into contact with the magnet at small case installation by permitting the magnet retaining boss to be press-fitted into the boss insert hole by a predetermined pushing force. That is, this invention allows the small case to be formed in a simple construction, makes it possible to use the small case interchangeably, and contributes much to reduction in manufacturing man-hours.

What is claimed is:

1. A miniature motor comprising a hollow tubular large case having a magnet along the inner circumferential surface thereof, and a small case fitted to said large case and having brush holders, made of a synthetic resin, and magnet retaining bosses making contact with said magnet, and characterized in that each of said brush holders has a boss insert hole into which said magnet retaining boss is press-fitted, one end of said magnet retaining boss is pushed by said magnet, at small case installation, causing said magnet retaining boss to be press-fitted into said boss insert hole, whereby said small case is fitted into said large case in a state where the end of said magnet retaining boss makes contact with said magnet.

2. A miniature motor set forth in claim (1) wherein said magnet retaining boss provided on said small case is formed integrally with said brush holder by means of a knockout portion which can be cut away when a pushing force is applied to the end thereof, each of said brush holders having a boss insert hole.

3. A miniature motor set forth in claim (1) wherein said small case has such a construction that magnet retaining bosses, provided separated from said brush holders, are press-fitted into said boss insert holes, and press-fitting is completed by forcing the ends of said magnet retaining bosses into said boss insert holes.

* * * * *